US010200808B2

(12) United States Patent
Meredith et al.

(10) Patent No.: US 10,200,808 B2
(45) Date of Patent: Feb. 5, 2019

(54) ANONYMIZATION OF LOCATION DATASETS FOR TRAVEL STUDIES

(71) Applicant: AT&T Mobility II LLC, Atlanta, GA (US)

(72) Inventors: Sheldon Kent Meredith, Marietta, GA (US); Mark Austin, Roswell, GA (US); Jeremy Fix, Acworth, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 458 days.

(21) Appl. No.: 14/686,583

(22) Filed: Apr. 14, 2015

(65) Prior Publication Data

US 2016/0306813 A1  Oct. 20, 2016

(51) Int. Cl.
*H04W 4/02* (2018.01)
(52) U.S. Cl.
CPC ..................... *H04W 4/02* (2013.01)
(58) Field of Classification Search
CPC ....................................................... H04W 4/02
USPC ........................................................ 707/738
See application file for complete search history.

(56) References Cited

U.S. PATENT DOCUMENTS

| | | | | |
|---|---|---|---|---|
| 6,546,257 B1 * | 4/2003 | Stewart | ............... | H04W 4/02 340/988 |
| 7,840,222 B2 * | 11/2010 | Hampel | ............... | G06Q 20/382 455/404.2 |
| 7,999,669 B2 * | 8/2011 | Singh | ............... | G06Q 10/109 340/539.11 |
| 8,073,460 B1 * | 12/2011 | Scofield | ............... | G06Q 30/02 455/414.1 |
| 8,606,260 B2 | 12/2013 | Chatterjee | | |
| 8,639,221 B1 * | 1/2014 | Zang | ............... | H04W 12/02 455/411 |

(Continued)

FOREIGN PATENT DOCUMENTS

WO  WO 2013128081 A1 *  9/2013  ............ H04W 4/00

OTHER PUBLICATIONS

Colak et al., "Analyzing Cell Phone Location Data for Urban Travel: Current Methods, Limitations and Opportunities", In Proceedings of Transportation Research Board Annual Meeting, 2015, pp. 1-17.*

(Continued)

*Primary Examiner* — Phuong Thao Cao

(57) ABSTRACT

Methods and devices for determining a number of mobile devices travelling from a first location to a second location are disclosed. A method includes determining a first subset of mobile location records associated with the first location, determining mobile device identifiers associated with the first subset, and modifying mobile location records in the first subset by replacing a mobile device identifier contained in each mobile location record with a new identifier of the first subset. The method may then determine a second subset of mobile location records associated with the second location, modify mobile location records in the second subset by replacing a mobile device identifier contained in each mobile location record with a new identifier of the first subset, and determine a number of mobile devices that travelled from the first location to the second location based upon the new identifier of the first subset.

20 Claims, 4 Drawing Sheets

(56) References Cited

U.S. PATENT DOCUMENTS

| | | | |
|---|---|---|---|
| 8,639,263 B2* | 1/2014 | Salmon | H04W 4/02 340/539.11 |
| 8,659,404 B2 | 2/2014 | Morgan et al. | |
| 8,812,027 B2 | 2/2014 | Obermeyer et al. | |
| 8,818,413 B2* | 8/2014 | Creemer | G06Q 30/02 455/412.1 |
| 8,855,681 B1* | 10/2014 | George | H04W 4/02 455/456.1 |
| 8,882,150 B2 | 10/2014 | Phillips et al. | |
| 8,886,178 B2 | 11/2014 | Chatterjee | |
| 9,219,788 B1* | 12/2015 | Buron | H04L 67/18 |
| 9,247,378 B2* | 1/2016 | Bisson | H04W 4/021 |
| 9,251,168 B1* | 2/2016 | Tomkins | G06F 17/30241 |
| 9,516,470 B1* | 12/2016 | Scofield | H04W 4/206 |
| 9,697,479 B2* | 7/2017 | Stamler | G06Q 10/02 |
| 2001/0036224 A1* | 11/2001 | Demello | H04L 63/30 375/220 |
| 2008/0071761 A1* | 3/2008 | Singh | G06F 17/3087 |
| 2008/0262667 A1* | 10/2008 | Otabe | B60W 10/06 701/22 |
| 2008/0293378 A1* | 11/2008 | Hinton | H04L 63/0407 455/411 |
| 2008/0293379 A1* | 11/2008 | Hinton | H04L 63/0414 455/411 |
| 2008/0293411 A1* | 11/2008 | Hinton | H04L 63/0407 455/435.1 |
| 2008/0312946 A1* | 12/2008 | Valentine | G06Q 20/382 705/64 |
| 2010/0273509 A1* | 10/2010 | Sweeney | G06Q 10/02 455/456.3 |
| 2011/0270673 A1* | 11/2011 | Lin | G06Q 30/02 705/14.45 |
| 2012/0046017 A1* | 2/2012 | Jennings | H04W 4/029 455/414.1 |
| 2012/0046860 A1* | 2/2012 | Curtis | G06Q 30/0282 701/418 |
| 2012/0066231 A1* | 3/2012 | Petersen | G06F 17/30867 707/748 |
| 2012/0135749 A1* | 5/2012 | Nagata | G01S 5/0205 455/456.1 |
| 2012/0221231 A1* | 8/2012 | Nagata | G08G 1/012 701/118 |
| 2012/0265585 A1 | 10/2012 | Muirbrook et al. | |
| 2012/0271717 A1* | 10/2012 | Postrel | G06Q 30/02 705/14.58 |
| 2013/0080774 A1* | 3/2013 | Combet | H04L 63/0421 713/168 |
| 2013/0090891 A1* | 4/2013 | Kobayashi | G06F 17/00 702/189 |
| 2013/0091452 A1 | 4/2013 | Sorden et al. | |
| 2013/0154828 A1* | 6/2013 | Singh | G01S 5/0252 340/539.13 |
| 2013/0260791 A1* | 10/2013 | Malinovskiy | H04W 4/02 455/456.1 |
| 2013/0281128 A1* | 10/2013 | Singh | G06Q 10/109 455/456.3 |
| 2013/0297551 A1* | 11/2013 | Smith | G06N 5/02 706/48 |
| 2014/0045482 A1* | 2/2014 | Bisson | H04W 4/021 455/420 |
| 2014/0082062 A1* | 3/2014 | Bellver | G06F 17/3087 709/203 |
| 2014/0273921 A1 | 9/2014 | Li et al. | |
| 2014/0279123 A1 | 9/2014 | Harkey et al. | |
| 2014/0329539 A1* | 11/2014 | Li | G01S 5/0072 455/456.1 |
| 2014/0365307 A1 | 12/2014 | Cheung | |
| 2014/0370911 A1 | 12/2014 | Gorgenyi et al. | |
| 2015/0019126 A1* | 1/2015 | Kozloski | G01C 21/3415 701/412 |
| 2015/0026181 A1* | 1/2015 | Milton | G06Q 30/0269 707/737 |
| 2015/0031388 A1 | 1/2015 | Chatterjee et al. | |
| 2015/0048941 A1* | 2/2015 | Wagner | G08G 1/207 340/539.13 |
| 2015/0057012 A1 | 2/2015 | Hong et al. | |
| 2015/0065177 A1 | 3/2015 | Phillips et al. | |
| 2015/0127728 A1* | 5/2015 | Marti | H04L 51/32 709/204 |
| 2015/0133143 A1* | 5/2015 | Huang | H04W 4/028 455/456.1 |
| 2015/0350843 A1* | 12/2015 | Jensen | H04W 4/029 455/456.3 |
| 2015/0373501 A1* | 12/2015 | Dribinski | H04W 4/021 455/456.1 |
| 2016/0012252 A1* | 1/2016 | Deleeuw | G06F 21/6254 726/26 |
| 2016/0048869 A1* | 2/2016 | Shim | G06Q 30/0246 705/14.45 |
| 2016/0066189 A1* | 3/2016 | Mahaffey | G06F 21/88 455/405 |
| 2016/0142917 A1* | 5/2016 | Calo | G06Q 20/102 705/7.33 |
| 2016/0148267 A1* | 5/2016 | Pittman | H04W 4/029 705/14.53 |
| 2016/0210594 A1* | 7/2016 | Zhao | G06Q 10/1097 |
| 2017/0017661 A1* | 1/2017 | Milton | G06Q 30/02 |
| 2017/0098093 A1* | 4/2017 | Koo | G06F 21/6209 |
| 2017/0257739 A1* | 9/2017 | Dal Santo | H04W 4/029 |
| 2017/0337574 A1* | 11/2017 | Postrel | G06Q 30/0235 |

OTHER PUBLICATIONS

Widhalm et al., "Discovering Urban Activity Patterns in Cell Phone Data", Transportation, vol. 42, No. 4, pp. 597-623, published online: Mar. 27, 2015.*

Zhou et al., "Privacy-Preserving Point-to-Point Transportation Traffic Measurement through Bit Array Masking in Intelligent Cyber-Physical Road Systems", 2013 IEEE International Conference on Green Computing and Communications and IEEE Internet of Things and IEEE Cyber, Physical and Social Computing, pp. 826-833, 2013.*

Bamba et al., "Supporting Anonymous Location Queries in Mobile Environments with PrivacyGrid", in Proceedings of the 17th International Conference on World Wide Web (WWW 2008), Apr. 21-25, 2008, Beijing, China, pp. 237-246. (Year: 2008).*

Phithakkitnukoon et al., "Understanding tourist behavior using large-scale mobile sensing approach: A case study of mobile phone users in Japan", Journal of Pervasive and Mobile Computing, vol. 8, Issue C, Apr. 2015, pp. 18-39. (Year: 2015).*

Zang et al., "Anonynnization of Location Data Does Not Work: A Large-Scale Measurement Study", in Proceedings of the 17th Annual International Conference on Mobile Computing and Networking, Sep. 19-23, 2011, Las Vegas, Nevada, USA, pp. 145-156. (Year: 2011).*

* cited by examiner

ANONYMIZATION OF LOCATION DATASETS FOR TRAVEL STUDIES

The present disclosure relates generally to methods, computer-readable media and devices for providing mobile device travel studies.

BACKGROUND

Cellular network operators collect a large amount of mobile device location data incidental to the rendering of services for subscribers. However, current Federal Communication Commission (FCC) rules may not permit the tracking of individuals and their mobile devices from location to location.

SUMMARY

In one example, the present disclosure discloses a method, computer-readable medium, and device for determining a number of mobile devices travelling from a first location to a second location by a processor. For example, the processor may determine a first subset of mobile location records associated with the first location, determine a plurality of mobile device identifiers associated with the first subset, and modify a first plurality of mobile location records in the first subset. In one example, for each of the first plurality of mobile location records in the first subset the modifying comprises replacing the mobile device identifier contained in the mobile location record with an identifier of the first subset. The processor may next determine a second subset of mobile location records associated with the second location and modify a second plurality of mobile location records in the second subset. In one example, each of the second plurality of mobile location records in the second subset contains a mobile device identifier of the plurality of mobile device identifiers associated with the first subset, and for each of the plurality of mobile location records in the second subset the modifying comprises replacing the mobile device identifier contained in the mobile location record with the identifier of the first subset. The processor may then determine a number of mobile devices that travelled from the first location to the second location based upon the identifier of the first subset, and report the number of mobile devices that have travelled from the first location to the second location.

In another example, the present disclosure discloses a method, computer-readable medium, and device for determining by a processor a location to which a greatest number of mobile devices associated with a plurality of mobile device identifiers have travelled. For instance, the processor may determine a first subset of mobile location records associated with the first area, determine a plurality of mobile device identifiers associated with the first subset, and modify a first plurality of mobile location records in the first subset. In one example, for each of the first plurality of mobile location records in the first subset the modifying comprises replacing the mobile device identifier contained in the mobile location record with an identifier of the first subset. The processor may next determine a second subset of mobile location records associated with the second area, and modify a second plurality of mobile location records in the second subset. In one example, each of the second plurality of mobile location records in the second subset contains a mobile device identifier of the plurality of mobile device identifiers associated with the first subset, and for each of the plurality of mobile location records in the second subset the modifying comprises replacing the mobile device identifier contained in the mobile location record with the identifier of the first subset. The processor may then determine, based upon the second plurality of mobile location records in the second subset, a location within the second area to which a greatest number of mobile devices associated with the plurality of mobile device identifiers have travelled, and report the location within the second area to which the greatest number of mobile devices associated with the plurality of mobile device identifiers have travelled.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
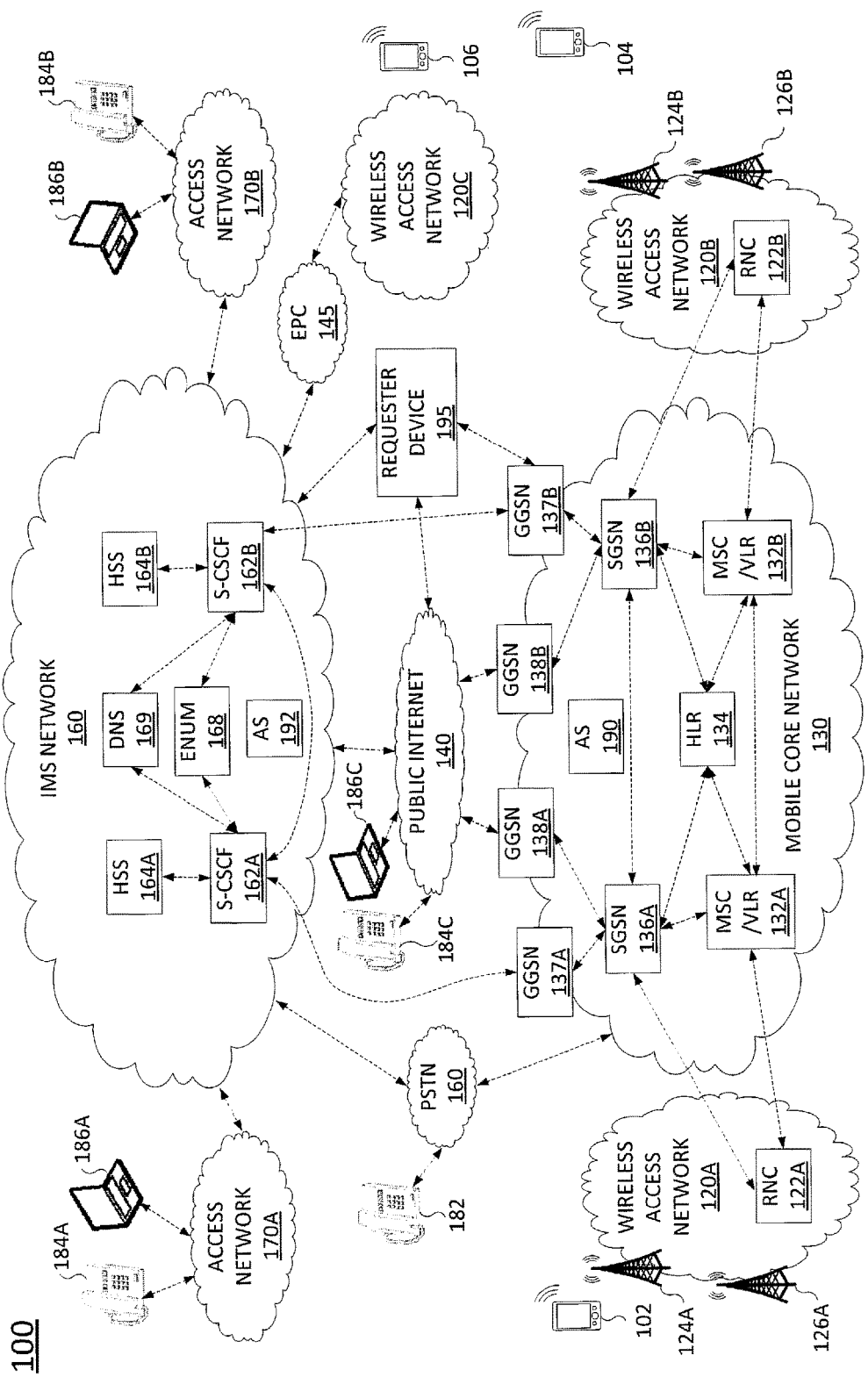
FIG. 1 illustrates an example system related to the present disclosure.

The present disclosure broadly discloses methods, computer-readable media, and devices for determining a number of mobile devices travelling from a first location to a second location, and for determining a location to which a greatest number of mobile devices associated with a plurality of mobile device identifiers have travelled. In particular, embodiments of the present disclosure provide for mobile device travel studies using mobile location records that may be unavailable for use according to Federal Communication Commission (FCC) rules. For example, the FCC may have prohibited the use of mobile location records from telecommunications services, also referred to as "mobile locates," for tracking individual mobile devices. Being able to track an individual mobile device from location A to B is considered to be a "use," and therefore may be precluded by FCC rules. The present disclosure organizes mobile location records in a novel manner so as to comply with the FCC rules, while still producing value from the data.

To illustrate, in one example the present disclosure may provide for a retailer to determine a number or percentage of visitors to one of its stores who eventually travel to one or more competitors' stores, or vice versa. In another example, the retailer may determine a number or percentage of visitors to one of its stores who eventually travel to a different one of the retailer's stores. In still another example, a regional tourism organization may determine a number or percentage of visitors traveled to a certain geographic area who then traveled to a second geographic area. For instance, it may be desirable to estimate how many visitors who fly into Orlando airports also choose to visit south Florida prior to leaving the state. In another example, a college near Boston may desire to know how many visitors to the campus also visited the campuses of other nearby colleges or peer institutions, e.g., during application and admission seasons. In still another example, the college may desire to know which hotels that the visitors choose to utilize while visiting the college. In general, the present disclosure provides for tracking mobile devices from a first location to a second location in such a way that individual mobile devices are not identifiable and are not traceable back to the actual mobile identifiers (mobile IDs) of the mobile devices, or to the users or registered owners of such mobile devices.

In one example, the present disclosure obtains mobile location records that pertain to both a first location ("location A") and a second location ("location B"). Each of the mobile location records includes a mobile ID pertaining to the mobile device associated with the mobile location record. A first subset of mobile location records, i.e., those associated with location A, are then parsed to extract the mobile IDs from each mobile location record in the first subset. The mobile ID in each mobile location record in the first subset is then replaced with a non-unique identifier. In other words, each of the mobile IDs is replaced with the same new identifier. The new identifier can be a preselected or randomly generated number, word, alphanumeric sequence, or the like. For example, the new identifier could be "subset" or "subset 1." The present disclosure may next search all of the mobile location records associated with location B. For instance, a second subset of mobile location records associated with location B may be searched for any occurrences of one of the mobile IDs extracted with respect to the first subset. When one of the mobile IDs is found in a mobile location record in the second subset, it is replaced with the new identifier, e.g., "subset 1." In one example, for each mobile ID that is encountered, the mobile ID is replaced with the new identifier, but an additional unique identifier is also added, resulting in, for example: "subset 1-1," "subset 1-2" . . . "subset 1-$n$," and so on. In other words, for each mobile ID that is found in the first subset of mobile location records, when the mobile ID is found in a mobile location record of the second subset of mobile location records, the mobile ID will be replaced with the new identifier and a different unique identifier, such that no two mobile IDs will be replaced with the same unique identifier. However, none of the unique identifiers is connected back to the original mobile ID which it replaces. As such, while the combination of the new identifier and the unique identifier may distinguish among different mobile devices, and therefore uniquely identify particular mobile devices, there is no traceability to the original mobile IDs, and therefore no connection to the user or registered owner of a particular mobile device.

Once the foregoing modifications to the mobile location records are performed, the present disclosure may then determine a number of mobile devices observed at location A that are also observed at location B. In one example, this may comprise counting the number of unique identifiers assigned above that is found in mobile location records associated with location B. In another example, this may comprise counting the number of unique mobile IDs extracted from the first subset, determining a total number of mobile location records associated with location A, and determining an average number of mobile location records per mobile ID. A number of mobile devices at location B that were also at location A may then be calculated by determining a total number of mobile location records associated with location B that include the new identifier, and dividing by the average number of mobile location records per mobile device.

To illustrate, a network operator may have a set of mobile location records for all of Atlanta, where location A could be the Atlanta Aquarium. In one example, the set of mobile location records is filtered to segregate all mobile location records belonging to all of the mobile devices in the subset at the Atlanta Aquarium. For this filtered subset, the mobile IDs in each mobile location record are all changed to be "subset," or some other identifier that is repeated for each mobile location record in the subset. The result of this process is that all of the mobile devices observed to be at the Atlanta Aquarium are now collectively identified as "subset" in all of the mobile location records in the set. This is an anonymization step that prevents discerning one of the mobile devices from another.

In one example, one or more relevant time periods may also be specified as criteria in connection with determining a number of mobile devices travelling from a first location to a second location. For example, a retailer may desire to know a number of mobile devices that were observed at or near the retailer's business location during a one week time period that were also observed at a competitor's location, e.g., within the same time period, a two week time period including the one week time period, and so forth. In one example, a relationship may be specified between two or more of the time periods. For instance, a retailer may desire to know a number of mobile devices that were observed at or near the retailer's business location during a one week time period that were also observed at a competitor's location within the same time period, but only within a six hour window following the time at which the mobile device was observed at the retailer's business location. It should be noted that either one or both of the location A and location B may comprise singular areas, or may comprise two or more non-contiguous areas. For instance, a retailer may be interested in determining where mobile devices that have visited any one of several of the retailer's stores have later travelled to another location. In other words, the present disclosure is not limited to determining a number of mobile devices travelling between only two singular locations or areas.

In another example, mobile location records are utilized to determine mobile devices travelling between a first area and one or more locations within a second area that are not designated in advance. In one example, the first area may comprise a location or a plurality of locations within the second area. In another example, the first area and the second area may partially overlap. In still another example, the first area and the second area may not share any common location(s). Notably, the first area and second area may be specified by a requester where, for example, the request may seek to determine a location within the second area that is visited by the greatest number of mobile devices that were also observed to have visited the first area. For example, the first area may comprise a large sports venue, and the second area may comprise an area of 50 miles surrounding the sports venue. The requestor may comprise one of the participating sports teams or an operator of the sports venue, with the purpose to determine locations that are most frequented by attendees of the sporting event, e.g., within two hours after the end of the sporting event. In one example, mobile location records in a first subset associated with the first area are reviewed to extract mobile IDs, and the mobile IDs replaced with a non-unique identifier. This process is similar to the example described above. Mobile IDs in mobile location records associated with the second area may also be replaced in a similar manner to the example described above. For instance, the mobile IDs may be replaced by the non-unique identifier. In one example, the mobile IDs may further be replaced by the non-unique identifier and one of a plurality of additional identifiers.

In one example, a sliding window or template of a certain size is positioned throughout the second area to provide a number of candidate locations or areas, and mobile location records from within each candidate location are observed to determine a number of mobile devices having a presence within the candidate location during the designated time period. The candidate location with the greatest number of unique additional identifiers that are encountered is determined to be the location visited by the greatest number of mobile devices that were also determined to have visited the first location, e.g., the sports venue. The number of mobile devices visiting each candidate location may also be estimated in a manner similar to that which is described above, e.g., determining the average number of mobile location records generated per mobile device in a given time period, and subsequent steps. Additional locations in the second area associated with the second most number of visiting mobile devices, the third most number of visiting mobile devices, and so forth, may also be determined depending upon the particular request.

In one example, additional filters may be applied to the mobile devices observed at a first location or first area prior to replacing the mobile identifiers with a non-unique identifier in the mobile location records. For instance, an additional filter may be all mobile devices with male users, with the goal to determine how many of such users at location A went to one or more other locations. In this case, all mobile devices meeting both filter criteria would have their mobile IDs replaced in the mobile location records, after which such records could be used for travel studies.

The present disclosure therefore permits a telecommunications network operator to perform travel studies, and to provide results to enterprise customers, for example. Notably, the travel study results of the present disclosure merely inform that a device known to have been at a first location went to a specified second location. Due to the replacement of the mobile ID with a generic identifier, any mechanism for identifying a particular mobile device is lost. Thus, the present disclosure avoids "tracking" individuals and their mobile devices, and complies with the FCC rules. The present disclosure anonymizes and aggregates the data prior to any "use." This capability unlocks mobile location records for use in travel studies and/or marketing studies involving understanding where mobile devices travel after visiting any location or area, without potential exposure of the users' and/or subscribers' identities.

To better understand the present disclosure, FIG. 1 illustrates an example network, or system 100 (e.g., a network having an integrated cellular network architecture), suitable for implementing examples of the present disclosure for determining a number of mobile devices travelling from a first location to a second location, system 100 includes example wireless access networks 120A and 120B, and a mobile core network 130 (e.g., a public land mobile network (PLMN)-universal mobile telecommunications system (UMTS)/General Packet Radio Service (GPRS) core network). In one example, each of the wireless access networks 120A and 120B is connected to the mobile core network 130 to provide an integrated cellular network architecture (e.g., a cellular network architecture that includes multi-generational protocols and technologies).

Wireless access networks 120A and 120B may each comprise a radio access network implementing such technologies as: global system for mobile communication (GSM), e.g., a base station subsystem (BSS), GSM enhanced data rates for global evolution (EDGE) radio access network (GERAN), or IS-95, among others, or a UMTS terrestrial radio access network (UTRAN) network, e.g., employing wideband code division multiple access (WCDMA), or a CDMA2000, among others. In other words, wireless access networks 120A and 120B may comprise networks in accordance with any "second generation" (2G) or "third generation" (3G) network technology. Thus, base stations 124A, 126A and 124B, 126B may each comprise a base transceiver station (BTS) or a NodeB. In one example, wireless access networks 120A and 120B may further include radio network controllers (RNCs) 122A and 122B (alternatively referred to as base station controllers (BSCs) in 2G terminology) for managing RF communication of the base stations 124A, 126A and 124B, 126B respectively. RNCs 122A and 122B may perform a variety of wireless network management related tasks such as wireless channel assignments, determining transmission power levels, controlling handovers from one base station to another base station, concentrating multiple signals from mobile endpoint devices for onward transmission to other portions of the respective wireless access networks 120A and 120B, or mobile core network 130, and to perform other functions.

Each of wireless access network 120A and 120B may interface with the mobile core network 130 of system 100 to facilitate communications for various endpoint devices, including mobile devices 102, 104, and 106, each of which may comprise a cellular telephone, a smartphone, a tablet computing device, a laptop computer, a pair of computing glasses, a wireless enabled wristwatch, or any other cellular-capable mobile telephony and computing device (broadly, "mobile endpoint devices").

In one embodiment, mobile core network 130 includes components of a public land mobile network (PLMN). For example, mobile core network 130 may include one or more mobile switching centers (MSCs) 132A and 132B for each wireless access network that forms part of the system 100. The mobile core network 130 may further include one or more home location registers (HLRs), such as HLR 134, which functions as a central repository of authentication and service validation information, subscription information, and other information pertaining to user subscriptions and services. Similarly, respective visiting location registers (VLRs) may be integrated within each MSC 132A and 132B, which function as temporary repositories of authentication and service validation information, subscription information, and other information pertaining to visiting user subscriptions and services when a user's mobile device is located in a particular geographic region serviced by a particular MSCNLR. For example, MSC 132A may be designated to serve and administer a first coverage area including wireless access network 120A. Thus, MSC 132A may maintain, e.g., in a visiting location register (VLR), user profile records for mobile devices currently serviced by base stations within the portion of the network that is the responsibility of MSC 132A (e.g., mobile device 102). Similarly, MSC 132B may be designated to administer a second coverage area that includes wireless access network 120B and to perform similar functions to those provided by MSC 132A.

Mobile core network 130 may also include GPRS network elements for handling data calls to and from mobile devices. Such network elements may include serving GPRS support nodes (SGSNs) 136A and 136B, gateway GPRS support nodes (GGSNs) 137A, 138A, 137B, and 138B, and related support components including media servers, application servers, and the like. An SGSN refers to a network node responsible for communicating with mobile devices and routing of data calls. Similar to MSCs 132A and 132B, SGSNs 136A and 136B may have specific coverage areas and be assigned to handle specific wireless access networks of the system 100. A GGSN refers to a network node responsible for the interworking between a GPRS network (e.g., components of core network 130 that support GPRS services and functionality) and external packet switched networks, e.g., the public Internet 140, IMS network 160, and other networks.

The mobile core network 130 may also include, in one embodiment, an application server (AS) 190. In one embodiment, AS 190 may comprise a computing system, such as computing system 400 depicted in FIG. 4, and may be configured to provide one or more functions for determining a number of mobile devices travelling from a first location to a second location and/or for determining a location to which a greatest number of mobile devices associated with a plurality of mobile device identifiers have travelled in accordance with the present disclosure. In one example, AS 190 is configured to receive a request with a number of criteria or parameters that may include: a first location or area, a second location or area, one or more time periods associated with the first location, one or more time periods associated with the second location, and so forth. In one example, the request may be received from a device associated with a requesting party, such as a retailer, tourism organization, and so on. For example, as illustrated in FIG. 1, system 100 may include a requester device 195 that may communicate with AS 190 via the Internet 140 and/or via one or more other components of mobile core network 130. In one example, AS 190 may determine a number of mobile devices travelling from a first location to a second location or a location to which a greatest number of mobile devices associated with a plurality of mobile device identifiers have travelled, as per the request, and provide a response to the requester device 195. Accordingly, the AS 190 may be connected directly or indirectly to any one or more network elements of mobile core network 130, and of the system 100 in general, that are configured to gather and forward network signaling and traffic data and other information and statistics, e.g., mobile location records, or data that can be transformed into mobile location records, to AS 190, and to receive instructions from AS 190. Due to the relatively large number of connections available between AS 190 and other network elements, none of the actual links to the application server are shown in FIG. 1.

In one example, system 100 may further include an IP multimedia subsystem (IMS) network 160. For instance, IMS network 160 may provide VoIP services to users connecting via access networks 170A and 170B which may comprise a Digital Subscriber Line (DSL) network, a broadband cable access network, a Local Area Network (LAN), a wireless LAN (WLAN), a metropolitan area network (MAN), an enterprise network, or other "trusted access network." In this regard, access networks 170A and 170B may include one or more wireless access points which may each comprise an IEEE 802.11 ("Wi-Fi") access point, an IEEE 802.16 ("WiMax") base station, a Bluetooth access point, a Bluetooth low energy (BLE) beacon or other near-field access point, and the like. The access networks 170A and 170B may be either directly connected to IMS network 160, or indirectly through one or more other networks.

IMS network 160 may also be responsible for routing voice and data calls from cellular networks. For example, calls may enter the IMS network 160 from wireless access network 120C via evolved packet core (EPC) 145, or from wireless access networks 120A and 120B via mobile core network 130. In particular, wireless access network 120C may comprise an evolved UTRAN (eUTRAN) that utilizes IMS network 160 for both voice and data call routing via an all-IP infrastructure.

Notably, mobile core network 130 may be fully equipped to route a voice or data call without invoking IMS network 160. However, in one example, traversal of IMS network 160 may be required to reach a VoIP user via access network 170A or access network 170B, e.g., endpoint devices 184A, 186A, 184B, and 186B respectively, or a 4G cellular user who is on an eUTRAN, e.g., mobile device 106 on wireless access network 120C. For instance, endpoint devices 184A and 184B may comprise Session Initiation Protocol (SIP)-enabled VoIP phones, whereas endpoint devices 186A and 186B may comprise personal computer, laptop computers, and the like, which may be referred to as "softphones." In another example, additional services may be obtained for cellular users on wireless access networks 120A and 120B via the IMS network, e.g., "VoIP over 3G" services, media services, and so forth.

In one example, access networks 120A and 120B and mobile core network 130 may provide 2G/3G fallback coverage in the event that a 4G/LTE access network is not available, or in the event that a mobile device is not 4G/LTE capable. As such, mobile devices may be registered with both IMS network 160 as well as with cellular core network 130. In this regard, it should be noted that EPC 145 and mobile core network 130 are illustrated as separate networks in FIG. 1. However, in another embodiment mobile core network 130 and evolved packet core (EPC) 145 may comprise a single integrated mobile core network for supporting features of 2-4G access networks, as well as any access network that may utilize still to be deployed or developed technologies. As such, in one example wireless access networks 120A, 120B, and 120C, mobile core network 130, EPC 145 and IMS network 160 (as well as access networks 170A and 170B) may all be controlled by a single network operator.

A first portion of IMS network 160 includes a Home Subscriber Server (HSS) 164A and a Serving-Call Session Control Function (S-CSCF) 162A. A second portion of IMS network 160 includes HSS 164B and S-CSCF 162B. A number of shared resources are also present within IMS network 160: an ENUM (tElephone NUmbering Mapping) server 168, a domain name service (DNS) server 169 and an Application Server (AS) 192.

An HSS refers to a network element residing in the control plane of the IMS network that acts as a central repository of all customer specific authorizations, service profiles, preferences, etc., with respect to both "home" users and "visiting" users who are temporarily present within a coverage area assigned to a particular HSS. The HSS may also perform user/endpoint device location tracking. Thus, HSS 164A and HSS 164B may store information relating to VoIP users utilizing access networks 170A, 170B as well as cellular users utilizing access networks 120A, 120B and/or 120C. HSS 164A and HSS 164B may also communicate with one another to confirm authorizations and to obtain user/subscriber records to service visiting users. In addition, as mentioned above, mobile devices may be registered with both IMS network 160 as well as with cellular core network 130. Accordingly, HSS 164A and HSS 164B may be configured to receive updates from HLR 134 regarding mobile device locations and registrations, and vice versa.

S-CSCFs 162A and 162B reside within the IMS core infrastructure and are connected to various network elements in the IMS network 160 using the Session Initiation Protocol (SIP) over the underlying IMS based core backbone network. S-CSCFs 162A and 162B may be implemented to register users, perform routing and maintain session timers, e.g., for VoIP services. For example, each S-CSCF may also interrogate an HSS to retrieve authorization, service information, user profiles, etc. As illustrated S-CSCF 162A may be configured to utilize HSS 164A, while S-CSCF 162B may be configured to utilize HSS 164B. In addition, S-CSCF 162A and HSS 164A may be delegated a first coverage area while S-CSCF 162B and HSS 164B may be delegated a second coverage area. In one example, these areas may wholly or partially overlap with areas of coverage of mobile core network 130, e.g., the areas assigned to MSC 132A/SGSN 136A and MSC 132B/SGSN 136B, respectively.

Figure 4:
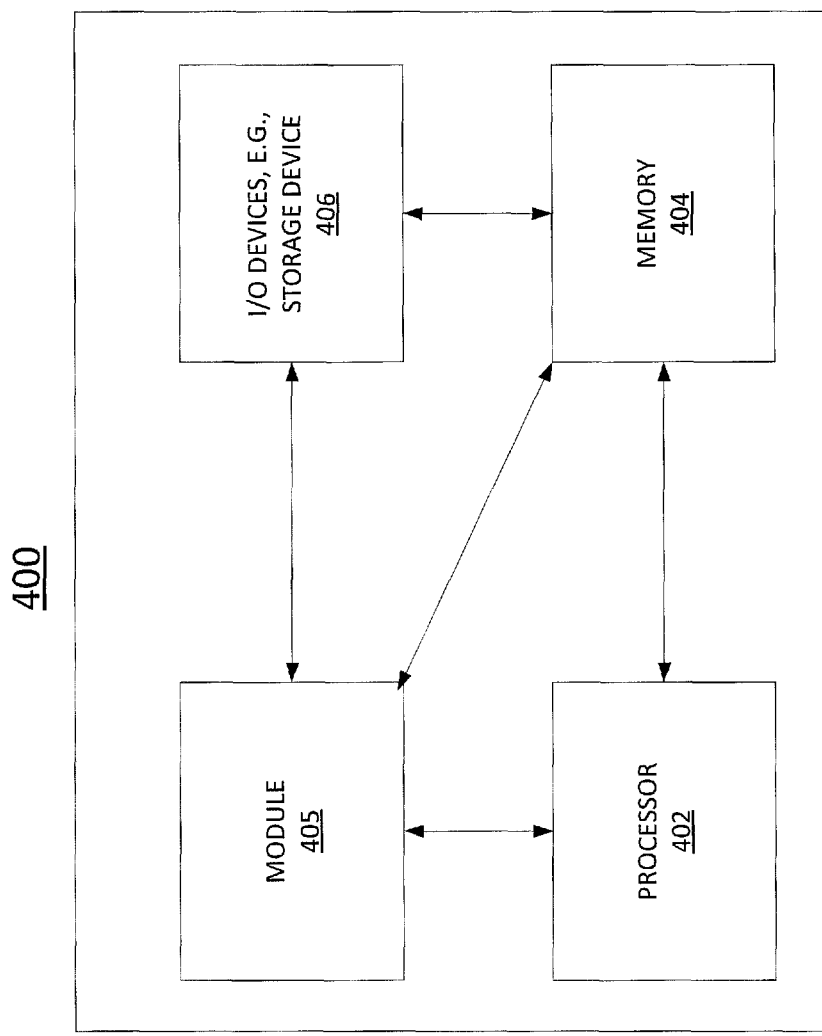
FIG. 4 illustrates a high-level block diagram of a computing device suitable for use in performing the functions, methods, and/or operations described herein.

In one embodiment, AS 192 may comprise a computing system, such as computing system 400 depicted in FIG. 4, and may be configured to provide one or more functions for determining a number of mobile devices travelling from a first location to a second location in accordance with the present disclosure. In one example, AS 192 is configured to receive a request with a number of criteria or parameters that include a first location or area, a second location or area, one or more time periods associated with the first location, one or more time periods associated with the second location, and so forth. In one example, the request may be received from a device associated with a requesting party, such as a retailer, tourism organization, and so on. For example, as illustrated in FIG. 1, system 100 may include a requester device 195 that may communicate with AS 192 via the Internet 140 and/or via one or more other components of IMS network 160.

In one example, AS 192 may determine a number of mobile devices travelling from a first location to a second location or a location to which a greatest number of mobile devices associated with a plurality of mobile device identifiers have travelled, as per the request, and provide a response to the requester device 195. Accordingly, the AS 192 may be connected directly or indirectly to any one or more network elements of IMS network 160, mobile core network 130, and of the system 100 in general, that are configured to gather and forward network traffic data and other information and statistics, e.g., mobile location records, or data that can be transformed into mobile location records, to AS 192, and to receive instructions from AS 192. Due to the relatively large number of connections available between AS 192 and other network elements, none of the actual links to the application server are shown in FIG. 1. In addition, AS 192 may perform the same or substantially similar functions to those of AS 190. In one example, AS 190 and AS 192 may cooperate to perform various aspects of the present disclosure in a distributed manner.

Each of mobile core network 130 and IMS network 160 may also interface to a public-switched telephone network (PSTN) 160, to enable communications with PSTN endpoints, e.g., endpoint device 182, and public Internet 140, to enable communications with devices accessible via the Internet, e.g., endpoint devices 184C, 186C, which may comprise a VoIP phone and a softphone, respectively. For example, VoIP users who are not subscribers of IMS network 160 or who are not on a "trusted access network" may nevertheless send and receive calls involving VoIP endpoint devices of access networks 170A and 170B and/or mobile endpoint devices on wireless access networks 120A, 120B, and 120C via the public Internet 140.

In accordance with the present disclosure, mobile device 102 may be associated with a user and/or with a registered owner. Mobile device 102 may comprise any type of cellular-capable mobile telephony and computing device (broadly, a "mobile endpoint device"). Thus, mobile device 102 is equipped with at least one cellular radio/transceiver and may connect with mobile core network 130 and/or IMS network 160 via any one or more of wireless access networks 120A, 120B and 120C. Mobile device 102 may also be equipped for any number of different modes of communication. For instance, mobile device 102 may be further equipped with an IEEE 802.11 transceiver, an IEEE 802.16 transceiver, a Bluetooth transceiver, and so on. In this regard, mobile device 102 may communicate with mobile core network 130 and/or IMS network 160 via any one or more of these different modes of communication. For instance, endpoint device 102 may travel such that mobile device 102 connects to IMS network 160 via access network 170A. In one example, access network 170A may comprise an open Wi-Fi network, the user's home Wi-Fi network, or a Wi-Fi network that is provided by the same network service provider that manages IMS network 160, mobile core network 130, etc. Similarly, mobile device 102 may connect with mobile core network 130 and/or IMS network 160 via the Internet 140.

The location of mobile device 102 may be determined in a variety of ways in conjunction with the system 100. For example, a location of mobile device 102 may be determined by device identifier such as an electronic serial number (ESN), a mobile equipment identifier (MEID), an integrated circuit card identifier (ICCID), an international mobile equipment identity (IMEI) or an international mobile subscriber identity (IMSI), a telephone number, e.g., an E.164 number or a number that is translatable into E.164 format, a media access control (MAC) address of a Wi-Fi transceiver, WiMax transceiver, Bluetooth transceiver, and the like, or an Internet Protocol address. Using such identifiers that are all associated with the same mobile device, the location and presence of the mobile device can be detected by various network components such as an IEEE 802.11 ("Wi-Fi") access point, an IEEE 802.16 ("WiMax") base station, a Bluetooth access point, a Bluetooth low energy (BLE) beacon or other near-field access point, and the like. The location of any number of mobile devices may be determined in the same or similar manner. It should be noted that in the present context, the determination of the location does not comprise a tracking of a particular mobile device from location to location. Rather, the foregoing describes how individual network signaling and traffic data and other information and statistics, e.g., individual mobile location records, or data that can be transformed into a single mobile location record, may be associated with a particular mobile device (where the mobile device has a number of identifiers attributable to the mobile device, any one or more of which may appear in a given source data stream from which a mobile location record is derived).

Notably, AS 190 and AS 192 may not actually perform device registrations with the respective networks. Thus, for example, a registration or other message containing device identification information and/or device location information may be received by AS 190 and/or AS 192 as a copy from one or more other network elements that are actively involved in the forwarding and the processing of the registration. Alternatively, or in addition, the location of mobile device 102 and other mobile devices may be tracked by one or more home subscriber servers (HSSs), home location registers (HLRs) a network equipment locator service (NELOS) and the like (broadly "cellular location systems"), where the location(s) stored by the respective devices are accessed by AS 190 and/or AS 192.

To illustrate, one or more of the device identifiers may be contained in a registration message, a session management message, a response to a paging message, a location update message, or similar message from the mobile device 102, and may be received via one or more network elements such as gateways/border elements, a P-CSCF, an S-CSCF, an MSC, etc. Depending upon the particular access network and/or the particular connection method utilized by mobile device 102, different device identifiers may be received for mobile device 102 at different times. For instance, if mobile device 102 is in a remote area without cellular coverage or if cellular radio(s) are turned off, but there is currently Wi-Fi access, the device identifier may include the Wi-Fi MAC address and/or an IP address. If endpoint device is in another area with only cellular coverage, the device identifier may not include the Wi-Fi MAC address, but may include the ESN, MEID, IMSI, and so forth. In one example, the device identifiers may be "normalized" or translated into a consistent mobile ID format. For instance, the device identifier contained in the message may be translated into an IMSI number, such that all mobile location records include the IMSI number as the mobile ID.

The location may be contained explicitly within the message, e.g., global positioning system (GPS) location information included in the message from endpoint device 102, serving base station information that is appended to a message by the base station or an MSC, and so forth, or may be determined based upon the route taken by the message and the network device(s) from which the message is received. In one example, mobile device 102 may connect to system 100 via a proxy device, such as a personal base station, mobile hotspot, a femtocell, and the like. Thus the location of the proxy device may be determined or approximated by AS 190, AS 192 or other component of system 100, and the location of mobile device 102 is assumed to be at or near the same location that is determined for the proxy device.

For example, base stations, wireless access points, and the like may have known locations which are stored by AS 190 and/or AS 192 (or other component of network 100) such that the approximate location of mobile device 102 may be inferred based upon the point at which the mobile device 102 connects to the network. In another example, the approximate location may be determined from the current IP address mobile device 102. For example, the IP address can be cross-referenced to a database that contains geographic approximations for various blocks of assigned IP addresses. In another example, the location may be determined by comparing relative timing offset information of different mobile devices that are communicating via the same cellular base station(s) as mobile device 102. Thus, the location of endpoint device 102 can be determined by AS 190 and/or AS 192 (or other component of network 100) in a variety of ways, and may be stored directly by AS 190 and/or AS 192, or may be stored in an HSS, a HLR, a NELOS system, or other storage location within system 100.

In one example, location information of mobile devices derived from various sources may be stored in a unified or distributed manner. For instance, a set of mobile location records may be stored, where each mobile location record comprises fields for a mobile ID, a location, and a timestamp. In one example, the mobile location records may be derived from network signaling and traffic data and other information and statistics from any of the devices in system 100, and may be stored in one of AS 190 and/or AS 192, or may be stored in an HSS, a HLR, a NELOS system, or other storage location within system 100. In one example, the mobile location records may be stored on a plurality of such devices, or may be stored on one or more additional devices, e.g., a number of storage servers connected to or integrated with system 100. In one example, each mobile location record may further include a field for a source of the mobile location record (e.g., base station registrations, VLR/HLR registrations, GPS information contained in messages from the mobile device/endpoint device, etc.).

In one example, each mobile location record may further include a field for an estimate of the accuracy of the location. For instance, if the mobile location record is sourced from GPS information provided by the mobile device itself, the accuracy may be noted as within 1-3 meters. However, if the source of the mobile location record is a registration of the mobile device with a base station, the accuracy may be anywhere from hundreds of meters to several kilometers. In one example, the accuracy may be based upon various factors, include the cell tessellation/geometry, whether the cell is densely-packed or not (e.g., in an urban environment, versus a rural environment), and so on. For instance, the size of a particular cell may have greater variability in a rural environment. Thus, the accuracy of the location noted in a mobile location record derived from a registration with a base station in a rural area may be noted as less accurate than a location noted in a mobile location record derived from a registration with a base station in an urban area.

The foregoing description of an integrated cellular network architecture of system 100 is provided only as an illustrative example. In other words, the example of system 100 is merely illustrative of one network configuration that is suitable for implementing embodiments of the present disclosure. As such, other logical and/or physical arrangements for the system 100 may be implemented in accordance with the present disclosure. For example, network components, such as MSCs 132A and 132B, may be included in respective wireless access network portions (e.g., wireless access networks 120A and 120B) instead of being deployed within the mobile core network 130, or in other portions of system 100 that are not shown, while providing essentially the same functionality. As another example, DNS server 169 may reside in mobile core network 130 or may comprise a public DNS server hosted by another entity on the public Internet 140. Similarly, system 100 may comprise multiple DNS servers, multiple ENUM servers, and so forth. Thus, these and other modifications are all contemplated within the scope of the present disclosure.

In addition, various elements of wireless access networks 120A, 120B, and 120C, EPC 145, mobile core network 130 and IMS network 160 are omitted for clarity, including gateways or border elements providing connectivity between such networks. Similarly, mobile core network 130 and IMS network 160 may each run atop an Internet Protocol/Multi-Protocol Label Switching IP/MPLS network infrastructure, the details of which are also omitted from FIG. 1.

Figure 2:
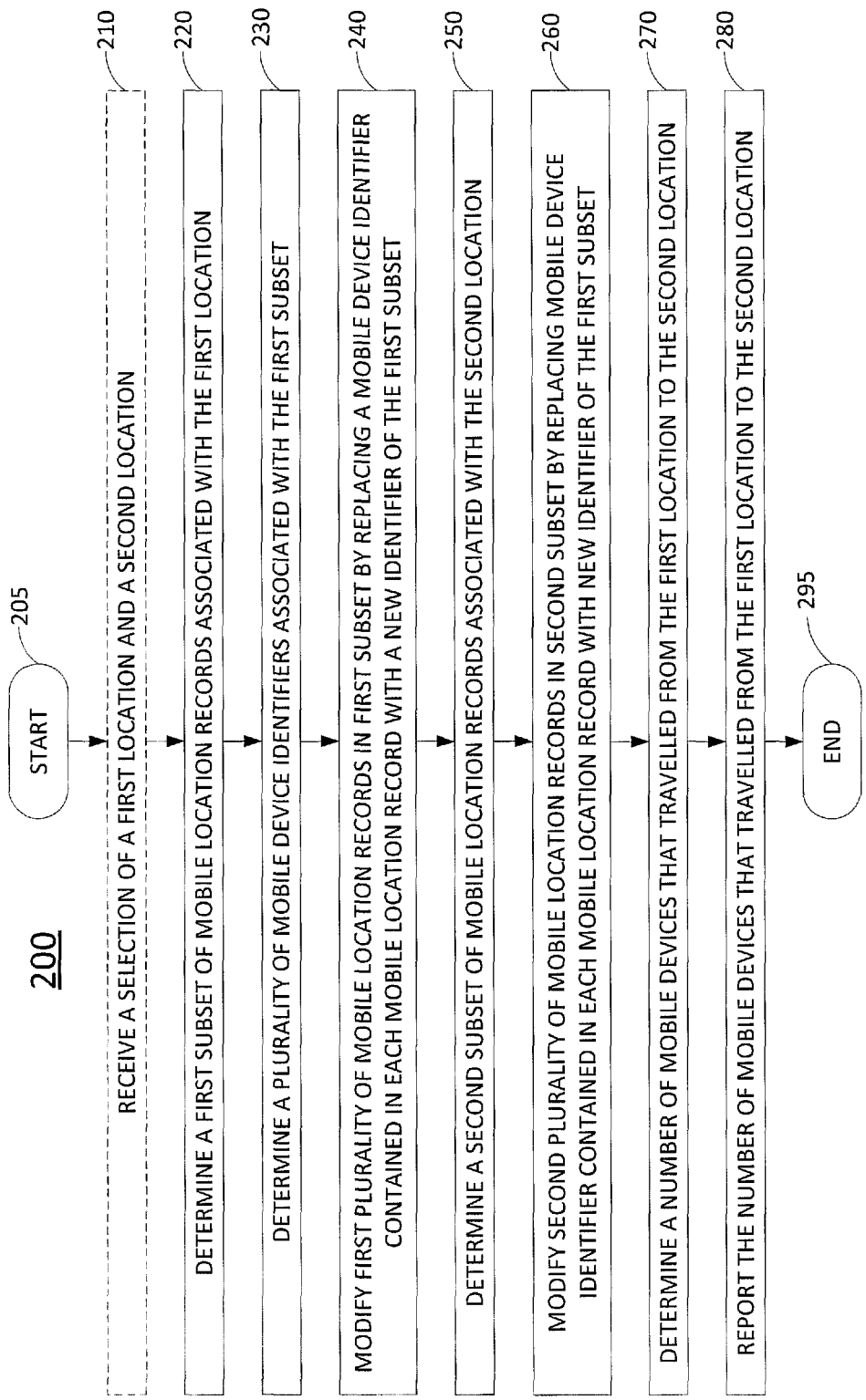
FIG. 2 illustrates a flowchart of an example method for determining a number of mobile devices travelling from a first location to a second location, according to the present disclosure.

FIG. 2 illustrates a flowchart of an example method 200 for determining a number of mobile devices travelling from a first location to a second location. In one example, the steps, operations or functions of the method 200 may be performed by any one or more of the components of the system 100 depicted in FIG. 1. For instance, the method 200 may be performed by application server 190 or application server 192. In another example, the method 200 is performed by application servers 190 and/or 192 in a distributed manner and in coordination with one another. Alternatively, or in addition, one or more steps, operations or functions of the method 200 may be implemented by a computing device having a processor, a memory and input/output devices as illustrated below in FIG. 4, specifically programmed to perform the steps, functions and/or operations of the method. Although any one of the elements in IMS network 160 or mobile core network 130 may be configured to perform various steps, operations or functions of the method 200, the method will now be described in terms of an example where steps of the method are performed by a processor, such as processor 402 in FIG. 4.

The method 200 begins in step 205 and proceeds to optional step 210. At optional step 210, the processor receives a selection of a first location and a second location. In one example, the selection may be received from a device of a retailer, a travel or tourism organization, an academic institution, and so forth. For instance, a retailer may desire to known the number or percentage of visitors to one of its stores who eventually travel to a competitor's store, or vice versa. In one example, at optional step 210 the processor may further receive one or more time parameters in addition to the selection of the first location and second location. For example, a retailer may desire to know a number of mobile devices that were observed at or near the retailer's business location during a one week time period that were also observed at a competitor's location within the same time period, a two week time period including the one week time period, and so forth. The requesting device may also include a parameter relating the time period in the first location to the time period in the second location. For instance, a retailer may desire to know a number of mobile devices that were observed at or near the retailer's business location during a one week time period that were also observed at a competitor's location within the same time period, but only within a six hour window following the time at which the mobile device was observed at the retailer's business location. It should be noted that step 210 is considered an optional step. For example, subsequent steps of the method 200 may not require that a first location and second location be received as selections from a requesting entity. For instance, a network operator may desire to perform its own travel studies for various purposes, in accordance with the present disclosure.

At step 220, the processor determines a first subset of mobile location records associated with the first location. For example, the first location may be specified as a particular set of coordinates and a radius, a city, zip code, county, state, or other designation of a bounded area, and so forth. It should be noted that the first location may also comprise one or more non-contiguous locations or areas. For instance, a retailer may be interested in knowing where visitors to several of its stores with a particular state may also be visiting. Thus, the "first location" may actually comprise several selected areas that include the retailer's stores of interest. In one example, the processor may access mobile location records from one or more storage locations to extract mobile location records pertaining to the first location. In one example, at step 220 the processor may further select mobile location records that match the first location and one or more time parameters associated with the first location. For instance, if a selection is received at optional step 210 from a retailer, and requests to know a number of mobile devices visiting the retailer's store on Saturday mornings during a four week sale period that subsequently visit a second location, at step 220 the processor may select only mobile location records matching the first location and with time stamps indicating a Saturday morning time during the relevant four week time period.

In one example, the processor may obtain a set of mobile location records associated with an area comprising a plurality of locations, e.g., including at least the first location and the second location. In one example, the processor may collect mobile location information regarding a plurality of devices within a network based upon network signaling and traffic data and other information and statistics that are sent and received within the network. In one example, the processor may transform the mobile location information received from a variety of sources into a plurality of mobile location records. In another example, the mobile location information may already be stored in a plurality of mobile location records. Thus, in one example, step 220 may comprise the processor accessing the mobile location records from one or more storage locations. In one example, each mobile location record may comprise a number of fields associated with any one or more of: a mobile ID, a location, a timestamp, a source of the location information, an accuracy of the location, and so forth.

At step 230, the processor determines a plurality of mobile device identifiers, e.g., mobile IDs, associated with the first subset of mobile location records, where the first subset comprises mobile location records associated with the first location. In one example, the processor review each of the mobile location records, extracts the mobile device identifier contained therein, and compiles a list of unique mobile device identifiers. For example, the same mobile device may generate mobile location information in a variety of ways. Thus, there may be a significant number of mobile location records associated with the mobile device that are derived from a variety of sources, such as: base station registrations, VLR/HLR records, GPS information provided by the mobile device itself, and so forth. At step 230, the goal is to verify all unique mobile device identifiers that are present in the first set of mobile location records. Notably, there is no need to resolve the different mobile location records pertaining to the same mobile device with one another. If a current mobile location record in the first subset relates to a mobile device identifier that has already been observed in a previous mobile location record in the first subset, then the processor simply moves on to the next mobile location record. If a mobile device identifier is found in the next mobile location record that has not previously been observed in the first subset, then the mobile device identifier is added to the list.

At step 240, the processor modifies a first plurality of mobile location records in the first subset by replacing a mobile device identifier contained within each mobile location record with a new identifier of the first subset. In one example, the new identifier of the first subset is used for all of the plurality of mobile location records in the first subset that will be modified. For instance, the new identifier may comprise a number, an alphanumeric sequence, such as "subset 1," and so forth. In one example, the first plurality of mobile location records comprises all of the mobile location records in the first subset.

At step 250, the processor determines a second subset of mobile location records associated with the second location. In one example, step 250 may comprise similar operations to those discussed above in connection with step 230. In one example, at step 250 the processor may further select mobile location records that match the second location and one or more time parameters associated with the second location.

In one example, a time parameter may relate to both the first location and the second location. For example, a retailer may desire to know the number of devices at or near its store during the month of March that also visited a competitor's store during the month of March. In another example, a different time parameter may relate to the second location. For instance, the retailer may desire to know a number of mobile devices that visited a particular store during a one week sale and that returned to any one of several of the retailer's stores in a six month period following the one week sale. In this regard, it should be noted that the "second location" may also comprise several selected areas, e.g., those that may include several competitor's stores of interest, or the like.

At step 260, the processor modifies a second plurality of mobile location records in the second subset by replacing a mobile device identifier in each mobile location record with the new identifier of the first subset. In one example, the second plurality of mobile location records in the second subset comprise only those mobile location records in the second subset that include mobile device identifiers that were found in the first subset and that were included in the list determined at step 230. In one example, the processor may examine each of the mobile location records in the second subset to determine if the mobile location record includes one of the mobile device identifiers in the list. In one example, each matching mobile device identifier is replaced with the new identifier of the first subset. In another example, when a mobile device identifier in the list is first encountered, it is replaced with the new identifier of the first subset and an additional identifier that is unique. Subsequently, for each additional mobile location record in the second subset that includes the same mobile device identifier, it is replaced with the new identifier of the first subset and the same additional identifier. However, following step 260 there is no connection retained between the original mobile device identifier and the additional unique identifier. This process is repeated for each unique mobile device identifier in the list that is encountered within the second subset of mobile location records. In various examples, the additional identifier may comprise a number, an alphanumeric sequence, and so forth. The use of the new identifier and additional unique identifiers may result in mobile location records in the second plurality having the mobile device identifier fields repopulated as: "subset 1-1," "subset 1-2," "subset 1-3," . . . "subset 1-N," and so on.

At step 270, the processor determines a number of mobile devices that travelled from the first location to the second location based upon the second plurality of mobile location records in the second subset. In one example, the number of mobile devices may be determined from a number of additional identifiers that are utilized in modifying the second plurality of mobile location records at step 260. In another example, if additional identifiers are not utilized, the number of mobile device may be determined as follows. The total number of mobile location records in the first subset from a given time period is divided by the number of mobile device identifiers found at step 230 to provide an average number of mobile location records per mobile device per the time period. Next, a total number of mobile location records in the second plurality of mobile location records for a same duration of time as the given time period is determined. In one example, the duration of time is the same, as well as the time of day, day of week, and so forth to as best match the conditions of the given time period associated with the first subset. This total number is then divided by the average number of mobile location records per mobile device per the time period previously calculated. The result is an estimate of the number of unique mobile devices associated with the second plurality of mobile location records, and may therefore be used as an estimate of the number of devices travelling from the first location to the second location.

At step 280, the processor reports the number of mobile device(s) that travelled from the first location to the second location. For instance, in one example the processor may report back the number of mobile device(s) to a requesting device from which a selection was received at optional step 210.

Following step 280, the method 200 proceeds to step 295 where the method 200 ends.

Figure 3:
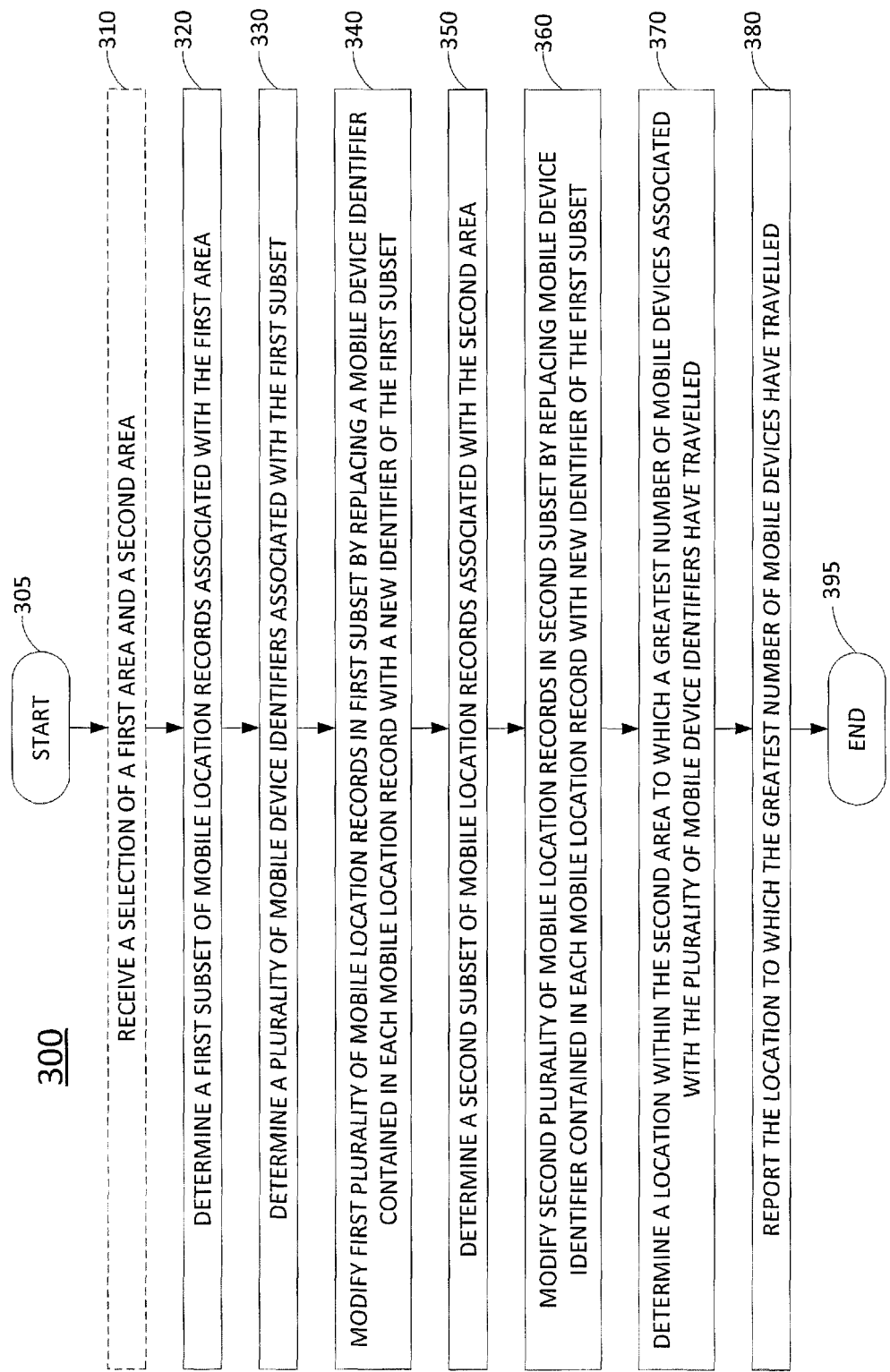
FIG. 3 illustrates a flowchart of an example method for determining a location to which a greatest number of mobile devices associated with a plurality of mobile device identifiers have travelled, according to the present disclosure.

FIG. 3 illustrates a flowchart of an additional example method 300 for determining a location to which a greatest number of mobile devices associated with a plurality of mobile device identifiers have travelled. In one example, the steps, operations or functions of the method 300 may be performed by any one or more of the components of the system 100 depicted in FIG. 1. For instance, the method 300 may be performed by application server 190 or application server 192. In another example, the method 300 is performed by application servers 190 and/or 192 in a distributed manner and in coordination with one another. Alternatively, or in addition, one or more steps, operations or functions of the method 300 may be implemented by a computing device having a processor, a memory and input/output devices as illustrated below in FIG. 4, specifically programmed to perform the steps, functions and for operations of the method. Although any one of the elements in IMS network 160 or mobile core network 130 may be configured to perform various steps, operations or functions of the method 300, the method will now be described in terms of an example where steps of the method are performed by a processor, such as processor 402 in FIG. 4.

The method 300 begins in step 305 and proceeds to optional step 310. At option step 310, the processor receives a selection of a first area and a second area. In one example, the selection may be received from a device of a retailer, a travel or tourism organization, an academic institution, and so forth. In one example, the first area may comprise a particular location, while the second area may comprise a larger region that includes a plurality of different locations. In one example, the first area may overlap with or reside entirely within the second area. However, in another example, the first area and the second area may not overlap. It should be noted that the first location may also comprise one or more non-contiguous locations or areas. For instance, a retailer may be interested in knowing where visitors to several of its stores with a particular state may also be visiting. Thus, the "first location" may actually comprise several selected areas that include the retailer's stores of interest, or the like. In one example, at optional step 310 the processor may further receive one or more time parameters in addition to the selection of the first area and second area. In this regard, optional step 310 may comprise similar operations to those discussed above in connection with optional step 210 of the method 200. In one example, a requesting device may further include a request to receive a report or notification of the top "X" number of locations within the second area to which mobile devices present at the first area have travelled. Similarly, the requesting device may specify to receive a notification or report of any location within the second area to which a number or percentage of mobile devices present at the first area have travelled that exceeds a threshold. For example, the requesting device may request to receive notification of any location within the second area for which it is determined that greater than ten mobile devices present at the first area have travelled.

In one example, the size of a location within the second area may also be specified as part of the request. For instance, a retailer may be interested in learning of a competitor's store that is visited by the greatest number of visitors to the retailer's own store. As such, in one example, the request may specify the location to be a circular area, a square area, or an area defined in any other manner such that the area is sufficient to encompass a typical retail establishment, but no so large so as to likely include multiple retail establishments of a similar type. To illustrate, a mall may have several department stores offering similar types of merchandise and may therefore all compete for customers' purchases. One of the department stores may desire to know which other of the department stores in the mall is most frequented by visitors to its own store. A location size that is large enough to encompass the entire mall is therefore not useful because there is no way to distinguish between devices located at the different department stores. On the other hand, a location size that is just larger than the typical department store, but no more, is likely to provide useful differentiation between mobile devices that are located within each of the different department stores.

At step 320, the processor determines a first subset of mobile location records associated with the first area. For example, the first area may be specified as a particular location, e.g., a particular set of coordinates and a radius, a city, zip code, county, state, or other designation of a bounded area, and so forth. In one example, the processor may access mobile location records from one or more storage locations to extract mobile location records pertaining to the first area. In one example, at step 320 the processor may further select mobile location records that match the first area and one or more time parameters associated with the first area. The operations of step 320 may comprise similar operations to those described above in connection with step 220 of the method 200.

At step 330, the processor determines a plurality of mobile device identifiers, e.g., mobile IDs, associated with the first subset of mobile location records. In one example, the processor reviews each of the mobile location records, extracts the mobile device identifier contained therein, and compiles a list of unique mobile device identifiers. Notably, step 330 may comprise similar operations to those described above in connection with step 230 of the method 200.

At step 340, the processor modifies a first plurality of mobile location records in the first subset by replacing a mobile device identifier contained within each mobile location record with a new identifier of the first subset. In one example, the new identifier of the first subset is used for all of the plurality of mobile location records in the first subset that will be modified. Notably, step 340 may comprise similar operations to those described above in connection with step 240 of the method 200.

At step 350, the processor determines a second subset of mobile location records associated with the second area. In one example, step 350 may comprise similar operations to those discussed above in connection with step 330. Alternatively, or in addition, step 350 may comprise similar operations to those discussed above in connection with step 250 of the method 200. However, in the present method 300, the second area may comprise a larger region that may include a plurality of different locations, as discussed in greater detail below in connection with step 370. In one example, at step 350 the processor may further select mobile location records that match the second area and one or more time parameters associated with the second area.

At step 360, the processor modifies a second plurality of mobile location records in the second subset by replacing a mobile device identifier in each mobile location record with the new identifier of the first subset. In one example, the second plurality of mobile location records in the second subset comprise only those mobile location records in the second subset that include mobile device identifiers that were found in the first subset and that were included in the list determined at step 330. In one example, step 360 may comprise similar operations to those described above in connection with step 260 of the method 200. For example, at step 360 the processor may examine each of the mobile location records in the second subset to determine if the mobile location record includes one of the mobile device identifiers in the list, and may replace each matching device identifier with the new identifier of the first subset. In another example, at step 360 when a mobile device identifier in the list is first encountered, it is replaced with the new identifier of the first subset and an additional identifier that is unique. Subsequently, for each additional mobile location record in the second subset that includes the same mobile device identifier, it is replaced with the new identifier of the first subset and the same additional identifier. In one example, this process is repeated for each unique mobile device identifier in the list that is encountered within the second subset of mobile location records.

At step 370, the processor determines a location within the second area to which a greatest number of mobile devices associated with the plurality of mobile device identifiers have travelled. In one example, a size of a candidate location may be specified at optional step 310. In one example, the location within the second area to which the greatest number of mobile devices associated with the plurality of mobile device identifiers have travelled is determined based upon the second plurality of mobile location records in the second subset. In one example, the number of mobile devices may be determined based upon a number of the additional identifiers that are utilized in modifying the second plurality of mobile location records at step 360. For instance, a number of unique additional identifiers that are found within mobile location records associated with a first candidate location may be counted. A number of unique additional identifiers that are found within mobile location records associated with a second candidate location may be counted, and so on.

In another example, the number of mobile devices that have travelled to a candidate location within the second area may be calculated using the same or similar process to that which is described above in connection with step 270 of the method 200. A plurality of candidate locations may be analyzed by shifting a window or template of a size specified in a request received at optional step 310 throughout the second area. For each candidate location, only mobile location records with a location field corresponding to the candidate location are considered. A candidate location having the highest count is then determined to be the location to which the most mobile devices have travelled. In one example, at step 370 the processor may further determine a second location within the second area to which the second highest number of mobile devices have travelled, a third location, and so forth. In one example, the processor may further record the number of mobile devices that are determined to have visited each location, or the percentage of mobile device that visited the first area that were also determined to have visited each of the locations within the second area.

At step 380, the processor reports the location within the second area to which a greatest number of mobile devices associated with the plurality of mobile device identifiers have travelled. For instance, in one example the processor may report back the location to a requesting device from which a selection was received at optional step 310. In one example, one or more additional locations within the second area to which a second greatest number of mobile devices have travelled, a third greatest number of mobile device have travelled, and so on, are also reported at step 380. In one example, the number of locations that are reported may be specified in the request received at optional step 310.

Following step 380, the method 300 proceeds to step 395 where the method ends.

In addition, although not specifically specified, one or more steps, functions or operations of the method 200 or the method 300 may include a storing, displaying and/or outputting step as required for a particular application. In other words, any data, records, fields, and/or intermediate results discussed in the method(s) can be stored, displayed and/or outputted either on a device executing the method 200 or the method 300, or to another device, as required for a particular application.

Furthermore, steps, blocks, functions or operations in FIGS. 2 and 3 that recite a determining operation or involve a decision do not necessarily require that both branches of the determining operation be practiced. In other words, one of the branches of the determining operation can be deemed as an optional step. In addition, one or more steps, blocks, functions or operations of the above described methods 200 and 300 may comprise optional steps, or can be combined, separated, and/or performed in a different order from that described above, without departing from the examples of the present disclosure.

The present disclosure may be extended to several additional examples. For instance, the respective methods 200 and 300 may be modified such that various steps may be performed simultaneously, or in a different order from the flowcharts of FIGS. 2 and 3. For example, step 250 may be commenced at the same time as step 240, without waiting for step 240 to be completed. In another example, steps 250 and 260 may be performed by a different processor or device than that which is performing steps 230, 240, and other steps of the method 200. For instance, a second processor may simply receive an indication of a second location, one or more other parameters or criteria relating to the request, and a list of mobile device identifiers in the first subset. Notably, the second processor does not know where the mobile devices associated with the list of mobile device identifiers have previously been. In other words, even though the list may indicate that the mobile devices were at the same location, there is no indication as to where the location is, or what time(s) the devices were at such location. The second processor may then determine the second subset of mobile location records at step 250 and modify a plurality of the records at step 260. One or both processors may then perform step 270 to determine the number of mobile devices that travelled from the first location to the second location. At no time is any individual mobile device known to one of the processors to have travelled from the first location to the second location. Similar modifications may be implemented with respect to the method 300. For example, step 350 may be commenced simultaneously with step 340, may be performed by one or more additional processors, and so forth.

Thus, these and other modifications are all contemplated within the scope of the present disclosure.

As such, the present disclosure provides at least one advancement in the technical field of cellular network operations, and more specifically in the field of tracking movements of multiple mobile devices from a first location to one or more additional locations while maintaining user and/or subscriber anonymity. This advancement is in addition to the traditional methods of simply tracking an individual mobile device from location to location by observing the same mobile device identifier in mobile location records pertaining to different locations. Such traditional methods may fail to maintain the privacy of movement of an individual mobile device and the user of such device, and may further run afoul of FCC rules regarding the rights of the subscriber and the obligations of the network operator. In contrast, the present disclosure provides for tracking mobile devices from a first location to one or more additional locations in such a way that individual mobile devices are not identifiable and are not traceable back to the actual mobile identifiers (mobile IDs) of the mobile devices, or to the users or registered owners of such mobile devices.

The present disclosure also provides a transformation of data, e.g., mobile device location information is transformed into mobile location records, which are further transformed into a modified first subset and modified second subset of mobile location records, which can then be used to determine a number of mobile devices travelling from a first location to a second location, or to determine a location to which a greatest number of mobile devices associated with a plurality of mobile device identifiers have travelled. In particular, the present disclosure anonymizes and aggregates the data prior to any "use." This capability unlocks mobile location records for use in travel studies and/or marketing studies involving understanding where mobile devices travel after visiting any location, without potential exposure of the users' and/or subscribers' identities.

Finally, embodiments of the present disclosure improve the functioning of a computing device, e.g., a server. Namely, a server for storing mobile location information and for responding to location information related queries is improved by organizing and modifying mobile location records in a novel manner so as to comply with the FCC rules, while still producing value from the data. When the server modifies each mobile location records in a first subset and a second subset to replace a mobile device identifier with a new identifier that is shared by all of the mobile location records that are modified, this allows the server to respond to inquiries to determine a number of mobile devices observed at first location or area that are also observed at one or more additional locations, while remaining in full compliance with FCC rules and protecting users'/subscribers' privacy of movement.

FIG. 4 depicts a high-level block diagram of a computing device suitable for use in performing the functions described herein. As depicted in FIG. 4, the system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for determining a number of mobile devices travelling from a first location to a second location or for determining a location to which a greatest number of mobile devices associated with a plurality of mobile device identifiers have travelled, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 or the method 300 as discussed above is implemented in a distributed or parallel manner for a particular illustrative example, i.e., the steps of the method, or the entire method is implemented across multiple or parallel computing devices, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method. In one embodiment, instructions and data for the present module or process 405 for determining a number of mobile devices travelling from a first location to a second location or for determining a location to which a greatest number of mobile devices associated with a plurality of mobile device identifiers have travelled (e.g., a software program comprising computer-executable instructions) can be loaded into memory 404 and executed by hardware processor element 402 to implement the steps, functions or operations as discussed above in connection with one or both of the illustrative methods 200 and 300. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for determining a number of mobile devices travelling from a first location to a second location or for determining a location to which a greatest number of mobile devices associated with a plurality of mobile device identifiers have travelled (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method, comprising:
receiving, by a processor of a service provider, from a third party, a request for a number of mobile devices that have travelled from a first business location to a second business location, a given time period, a first selection of the first business location, and a second selection of the second business location;
determining, by the processor of the service provider, a first subset of mobile location records associated with the first business location;
determining, by the processor of the service provider, a plurality of mobile device identifiers associated with the first subset, wherein each of the plurality of mobile device identifiers is contained in a mobile location record in the first subset;
modifying, by the processor of the service provider, a first plurality of mobile location records in the first subset of mobile location records, wherein for each of the first plurality of mobile location records the modifying comprises replacing the mobile device identifier contained in each mobile location record with a new identifier of the first subset;
determining, by the processor of the service provider, a second subset of mobile location records associated with the second business location;
modifying, by the processor of the service provider, a second plurality of mobile location records in the second subset, wherein each of the second plurality of mobile location records in the second subset contains a mobile device identifier of the plurality of mobile device identifiers associated with the first subset, wherein for each of the second plurality of mobile location records the modifying comprises replacing the mobile device identifier contained in each mobile location record with the new identifier of the first subset;
determining, by the processor of the service provider, the number of mobile devices that have travelled from the first business location to the second business location based upon the second plurality of mobile location records in the second subset, wherein the determining the number of mobile devices that have travelled from the first business location to the second business location based upon the second plurality of mobile location records in the second subset comprises:
determining an average number of mobile location records in the first subset associated with each mobile device identifier of the plurality of mobile device identifiers for the given time period;
determining a total number of mobile location records in the second plurality of mobile location records for a time period of a same duration as the given time period; and
dividing the total number of mobile location records in the second plurality of mobile location records for the time period of the same duration as the given time period by the average number of mobile location records in the first subset associated with each mobile device identifier of the plurality of mobile device identifiers for the given time period; and reporting, to the third party, by the processor of the service provider, the number of mobile devices that have travelled from the first business location to the second business location to provide a travel pattern associated with the number of mobile devices for use by the third party in a marketing study, wherein the third party is different from the service provider.

2. The method of claim 1, wherein the modifying the second plurality of mobile location records in the second subset comprises, for each mobile location record in the second plurality of mobile location records, replacing the mobile device identifier contained in the mobile location record with the new identifier of the first subset and an additional identifier that uniquely identifies a mobile device associated with the mobile device identifier as compared to other mobile devices.

3. The method of claim 2, wherein the determining the number of mobile devices that have travelled from the first business location to the second business location based upon the second plurality of mobile location records in the second subset comprises determining a number of additional identifiers that appear within the second subset.

4. The method of claim 2, wherein after the modifying the second plurality of mobile location records in the second subset, each of the additional identifiers is not associated with any one of the mobile device identifiers that was previously contained in a mobile location record of the second plurality of mobile location records.

5. The method of claim 1, further comprising:
obtaining, by the processor, a set of mobile location records associated with an area comprising a plurality of business locations,
wherein the plurality of business locations includes the first business location and the second business location.

6. The method of claim 5, wherein the first selection of the first business location and the second selection of the second business location are received from a requesting device of the third party, wherein at least one of the first business location and the second business location comprises a business location associated with the requesting device.

7. The method of claim 1, further comprising:
receiving, by the processor, a first time parameter associated with the first business location; and
receiving, by the processor, a second time parameter associated with the second business location.

8. A method, comprising:
receiving, by a processor of a service provider, from a third party, a request for a number of mobile devices that have travelled from a first area to a second area, a given time period, a first selection of the first area, and a second selection of the second area;
determining, by the processor of the service provider, a first subset of mobile location records associated with the first area;
determining, by the processor of the service provider, a plurality of mobile device identifiers associated with the first subset, wherein each of the plurality of mobile device identifiers is contained in a mobile location record in the first subset;
modifying, by the processor of the service provider, a first plurality of mobile location records in the first subset of mobile location records, wherein for each of the first plurality of mobile location records the modifying comprises replacing the mobile device identifier contained in each mobile location record with a new identifier of the first subset;
determining, by the processor of the service provider, a second subset of mobile location records associated with the second area;
modifying, by the processor of the service provider, a second plurality of mobile location records in the second subset, wherein each of the second plurality of mobile location records in the second subset contains a mobile device identifier of the plurality of mobile device identifiers associated with the first subset, wherein for each of the second plurality of mobile location records the modifying comprises replacing the mobile device identifier contained in the mobile location record with the new identifier of the first subset;
determining, by the processor of the service provider, based upon the second plurality of mobile location records in the second subset, a business location within the second area to which a greatest number of mobile devices associated with the plurality of mobile device identifiers have travelled, wherein the determining, based upon the second plurality of mobile location records in the second subset, the business location within the second area to which the greatest number of mobile devices associated with the plurality of mobile device identifiers have travelled comprises:
determining an average number of mobile location records in the first subset associated with each mobile device identifier of the first plurality of mobile device identifiers in the given time period;
determining a total number of mobile location records of the second plurality of mobile location records in the second subset for a time period of a same duration as the given time period; and
dividing the total number of mobile location records in the second plurality of mobile location records for the time period of the same duration as the given time period by the average number of mobile location records in the first subset associated with each mobile device identifier in the first plurality of mobile device identifiers for the given time period; and
reporting, to the third party, by the processor of the service provider, the business location within the second area to which the greatest number of mobile devices associated with the plurality of mobile device identifiers have travelled to provide a travel pattern associated with the greatest number of mobile devices associated with the plurality of mobile device identifiers for use by the third party in a marketing study, wherein the third party is different from the service provider.

9. The method of claim 8, further comprising:
reporting, by the processor, a number of mobile devices associated with the plurality of mobile device identifiers that have travelled to the business location within the second area to which the greatest number of mobile devices associated with the plurality of mobile device identifiers have travelled.

10. The method of claim 8, further comprising:
determining, by the processor, based upon the second plurality of mobile location records in the second subset, a second business location within the second area to which a second greatest number of mobile devices associated with the plurality of mobile device identifiers have travelled.

11. The method of claim 10, further comprising:
reporting, by the processor, a number of mobile devices associated with the plurality of mobile device identifiers that have travelled to the second business location within the second area to which the second greatest number of mobile devices associated with the plurality of mobile device identifiers have travelled.

12. The method of claim 8, wherein the modifying the second plurality of mobile location records in the second subset further comprises, for each mobile location record in the second plurality of mobile location records, replacing the mobile device identifier contained in the mobile location record with the new identifier of the first subset and an additional identifier that uniquely identifies a mobile device associated with the mobile device identifier as compared to other mobile devices.

13. The method of claim 12, wherein the determining, based upon the second plurality of mobile location records in the second subset, the business location within the second area to which the greatest number of mobile devices associated with the plurality of mobile device identifiers have travelled comprises:
determining a number of additional identifiers that appear within mobile location records in the second subset that are associated with the business location within the second area.

14. The method of claim 12, wherein after the modifying the second plurality of mobile location records in the second subset, each of the additional identifiers is not associated with any one of the mobile device identifiers that was previously contained in a mobile location record of the second plurality of mobile location records.

15. The method of claim 8, further comprising:
receiving, by the processor, a first time parameter associated with the first area; and
receiving, by the processor, a second time parameter associated with the second area.

16. A device, comprising:
a processor of a service provider; and
a computer-readable medium storing instructions which, when executed by the processor of the service provider, cause the processor to perform operations, the operations comprising:
receiving from a third party, a request for a number of mobile devices that have travelled from a first business location to a second business location, a given time period, a first selection of the first business location, and a second selection of the second business location;
determining a first subset of mobile location records associated with the first business location;
determining a plurality of mobile device identifiers associated with the first subset, wherein each of the plurality of mobile device identifiers is contained in a mobile location record in the first subset;
modifying a first plurality of mobile location records in the first subset of mobile location records, wherein for each of the first plurality of mobile location records the modifying comprises replacing the mobile device identifier contained in each mobile location record with a new identifier of the first subset;
determining a second subset of mobile location records associated with the second business location;
modifying a second plurality of mobile location records in the second subset, wherein each of the second plurality of mobile location records in the second subset contains a mobile device identifier of the plurality of mobile device identifiers associated with the first subset, wherein for each of the second plurality of mobile location records the modifying comprises replacing the mobile device identifier contained in the mobile location record with the new identifier of the first subset;
determining the number of mobile devices that have travelled from the first business location to the second business location based upon the second plurality of mobile location records in the second subset, wherein the determining the number of mobile devices that have travelled from the first business location to the second business location based upon the second plurality of mobile location records in the second subset comprises:
determining an average number of mobile location records in the first subset associated with each mobile device identifier of the plurality of mobile device identifiers for the given time period;
determining a total number of mobile location records in the second plurality of mobile location records for a time period of a same duration as the given time period; and
dividing the total number of mobile location records in the second plurality of mobile location records for the time period of the same duration as the given time period by the average number of mobile location records in the first subset associated with each mobile device identifier of the plurality of mobile device identifiers for the given time period; and
reporting, to the third party, the number of mobile devices that have travelled from the first business location to the second business location to provide a travel pattern associated with the number of mobile devices for use by the third party in a marketing study, wherein the third party is different from the service provider.

17. The device of claim 16, wherein the modifying the second plurality of mobile location records in the second subset further comprises, for each mobile location record in the second plurality of mobile location records, replacing the mobile device identifier contained in the mobile location record with the new identifier of the first subset and an additional identifier that uniquely identifies a mobile device associated with the mobile device identifier as compared to other mobile devices.

18. The device of claim 17, wherein the determining the number of mobile devices that have travelled from the first business location to the second business location based upon the second plurality of mobile location records in the second subset comprises determining a number of additional identifiers that appear within the second subset.

19. The device of claim 17, wherein after the modifying the second plurality of mobile location records in the second subset, each of the additional identifiers is not associated with any one of the mobile device identifiers that was previously contained in a mobile location record of the second plurality of mobile location records.

20. The device of claim 16, wherein the operations further comprise:
obtaining a set of mobile location records associated with an area comprising a plurality of business locations, wherein the plurality of business locations includes the first business location and the second business location.

* * * * *